July 14, 1970           P. P. HOLLACK           3,520,491
SPOOL SUPPORTING DEVICE
Filed Sept. 16, 1968
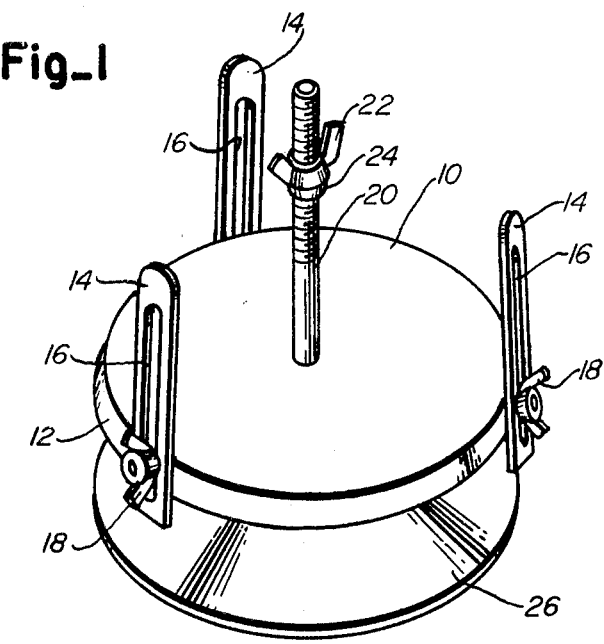
Fig_1
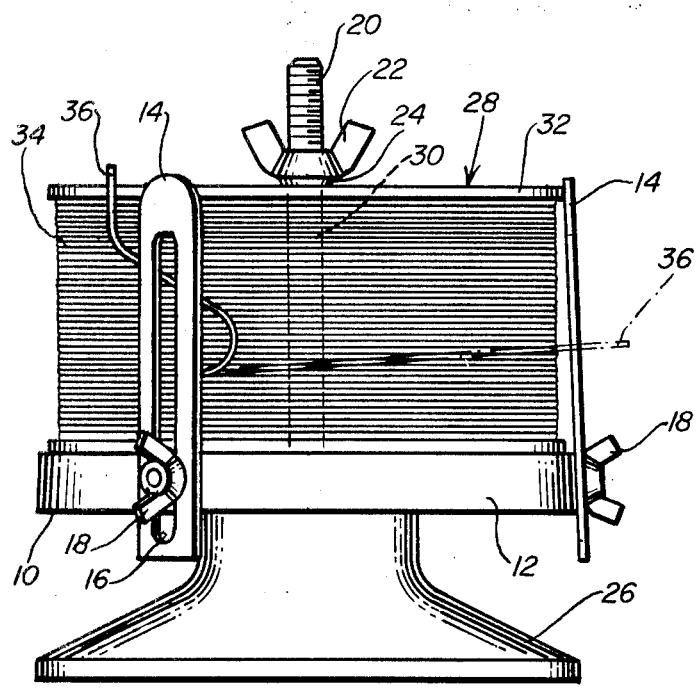
Fig_2
INVENTOR
PETER P. HOLLACK
BY *Peter L. Costas*
ATTORNEY

United States Patent Office 3,520,491
Patented July 14, 1970

---

3,520,491
SPOOL SUPPORTING DEVICE
Peter P. Hollack, 15 Douglas St.,
Windsor, Conn. 06095
Filed Sept. 16, 1968, Ser. No. 762,273
Int. Cl. B65h *49/00, 49/36*
U.S. Cl. 242—129.8                                    11 Claims

ABSTRACT OF THE DISCLOSURE

A spool supporting device comprises a base member, a shaft extending upwardly therefrom and a finger also extending upwardly from the base member and spaced from the shaft. The shaft is insertable into the axial passageway of a spool of material and the finger and shaft are spaced a sufficient distance apart to seat the spool therebetween with the finger bearing thereagainst.

BACKGROUND OF THE INVENTION

In removing thread, yarn, fishing line and the like from storage spools conventionally used therefor, it is often necessary or at least more convenient to provide a supporting device to free the operator's hands or to automate the operation entirely. In some instances the spool is wound in such a manner that the continuous strand of material is best removed tangentially therefrom, whereas in other cases the winding is such that the material should be removed in an axial direction, and this is particularly true in the case of fishing line. Thus, the line used for salt water fishing is normally removed tangentially with the spool rotating, whereas the line used with spinning tackle is usually wound for axial removal with the spool held stationary. Accordingly, it is desirable that a single supporting device be suited for use with both types of storage spools, and most desirably that the device also be portable and relatively simply and inexpensive to manufacture.

So far as is known, no device possessing all of these characteristics is provided by the prior art, and generally they are designed for, and are restricted to, use in only one of the two alternative ways described. Moreover, the prior art structures tend to lack portability, are often rather complicated and are frequently expensive to produce.

Accordingly, it is an object of the present invention to provide a device which supports a spool of material and permits the removal of a continuous strand thereof in either a tangential direction or in an axial direction relative to the spool.

It is also an object of the invention to provide such a device which is highly portable, simple in design and relatively economical to produce.

BRIEF DESCRIPTION OF THE DRAWING

FIG. 1 is a perspective view of a spool supporting device embodying the present invention; and FIG. 2 is an elevated view of such a device supporting a spool of material therein and illustrating the two alternate ways by which the material wound thereon may be removed.

SUMMARY OF THE INVENTION

It has now been found that the foregoing and related objects can be readily attained in a spool supporting device having a supporting base member and a shaft extending axially upwardly from the base member. A finger also extends upwardly from the base member and is spaced from the shaft, and spool-retaining means is provided on the device, most generally upon the shaft. The shaft is insertable into the axial passageway of the spool to be supported by the device, and the finger and shaft are spaced apart a sufficient distance to allow the spool to be seated therebetween with the finger bearing thereagainst.

More specifically, the base member may be in the shape of a disk, and preferably a plurality of fingers are adjustably secured about the periphery thereof. The shaft may have a threaded portion adjacent its free end, and the retaining means may conveniently be a nut or other fastener threaded thereonto. Most desirably, the retaining means is dimensioned and configured to center the spool on the shaft and to prevent substantial relative axial movement therebetween. The surface portion of the base member underlying the fingers at the points of attachment therebetween may advantageously be bevelled or angularly disposed toward the axis thereof and the shaft in order to orient each of the fingers in an angular relationship toward the shaft. Most desirably the device has mounting means engageable with a support surface for supporting the device thereon.

DETAILED DESCRIPTION OF THE ILLUSTRATED EMBODIMENT

Turning now in detail to the appended drawing, FIGS. 1 and 2 illustrate a spool-supporting device embodying the present invention and comprising a disk-shaped base member 10 which has a circumferential edge surface 12 inclined upwardly toward the axis thereof. Three upwardly extending elongated fingers 14 are equidistantly spaced about the circumference of the base member 10, and each finger 14 has a longitudinal slot 16 for receiving the thumbscrew 18 by which it is adjustably secured to the base member 10. A threaded shaft 20 extends coaxially upwardly from the center of the base member 10 and a wingnut 22 is threadably engaged thereon. As best seen in FIG. 2, the wingnut 22 has a depending portion 24 which has a diminishing cross section outwardly from the body thereof to provide a tapered circumferential surface of generally frustoconical configuration. A suction cup member 26 secured to the base 10 provides means by which the device can be mounted upon a suitable supporting surface.

In FIG. 2 a spool, generally designated by the numeral 28, upon which is wound a continuous length of filament 34, is seated upon the upper surface of the base member 10 with the shaft 20 inserted through the axial passageway 30 thereof. The spool 28 is retained in the device against relative axial movement by the wingnut 22, which is tightened on the shaft 20 to cause its tapered surface portion 24 to enter partially into the passageway 30 and to bear against the surface defining the entrance thereof. The fingers 14 are adjusted relative to the base 10 so that the upper or free ends thereof extend to the upper rim 32 of the spool 28. The bevel of the edge surface 12 causes the fingers to be inclined angularly inwardly when tightened thereagainst by the thumbscrews 18 so that their upper ends bear firmly against the rim 32 of the spool 28.

The filament 34 may be unwound from the spool 28 in one manner by taking the end 36 thereof from the spool 28 in a generally axial direction, in which case the nut 22 is tightened securely against the spool 28 to prevent the rotation thereof. As the filament 34 is uncoiled from the spool 28, it necessarily passes between the upper rim 32 and the upper end of each finger 14, thus providing controlled tension and avoiding entanglement thereof. Alternatively, a second manner for removal is shown by the dotted line representation wherein the end 36 of the filament 34 is removed from the spool 28 in a tangential direction. In this instance, the nut 22 is tightened enough so that it retains the spool 28 against axial movement and yet allows its rotation in the device. However, free rotation of the spool 28 may adequately be discouraged as a result of the pressure of the fingers 14 upon the rim 32, or the wingnut may be used in cooperation therewith in order to retard an undesirably free degree of rotation.

The configuration of the base member is not critical to the invention, although the upper surface thereof will usually be planar to most readily accommodate an end of the spool thereupon. Since the device will normally be used for cylindrically-shaped, or for otherwise configured spools having a circular cross section, the base member is most suitably in the general shape of a disk. To facilitate the arrangement of one more fingers thereon and to provide adequate support under the spool, the transverse dimensions of the base member should be at least equal to the corresponding spool dimensions; thus, when the base member is a disk the diameter thereof should be at least equal to the diameter of the spool, and preferably it is somewhat greater.

The shaft which is provided projects generally perpendicularly from the upper surface of the base member, and normally it is positioned at the geometric center thereof and extends coaxially therefrom. However, other arrangements may also be used such as in a device having the finger and shaft positioned adjacent opposite edges of a web, providing base member support only under part of a mounted spool. Preferably the shaft is at least as long as the axial passageway through the longest spool for which the device is designed, and the cross-sectional dimensions thereof should be sufficiently small to allow it to pass into the spool passageway and yet be sufficient to provide adequate strength. The shaft may be a separate element permanently affixed to the base and it may be integrally formed therewith such as by casting or molding; however, if so desired the shaft may be a separate element which is disengageably mounted on the base member by threaded engagement or other suitable means.

If the shaft is designed to be disengageable from the base member, the retaining means for the spool may conveniently be a permanent part of the shaft. For example, the shaft may have an enlarged portion adjacent one end for engagement with the spool; then the other end can be inserted through the axial passageway and joined with the base member, such as by threading it thereinto, to mount the spool in the device. Otherwise, the retaining means may be a member disengageably secured on the shaft at a distance spaced above the base member. Thus, the shaft may be partially or completely threaded and the retaining means be provided simply by a nut threaded thereonto, as is shown in the drawing, or the shaft may have a smooth surface and be employed with a spring clip-type of retaining member.

The retaining members most advantageously have a depending position providing a tapered surface to permit partial insertion into the passageway of the spool. When such a member is forced against the spool, the tapered surface thereof bears against the surface defining the entrance of the passageway and serves not only to prevent disassembly of the spool from the shaft, but also to centralize the spool thereon. Although the retaining means most conveniently comprises a member positioned on the shaft, other means may be employed, such as gripping elements or surfaces on the base member or on the fingers respectively, designed to engage the spool and substantially limit the tendency for inadvertent disassembly thereof from the supporting device.

As has been indicated, one or more fingers are provided about the base and extend upwardly therefrom in spaced relationship to the shaft. Although a single finger may be adequate, it is generally preferable to provide a plurality, most desirably at least three, of fingers equidistantly spaced about the circumference of the base. The fingers may either be elements separable from the base member or they may be integrally formed therewith. In the latter type of structure the fingers should be resiliently deflectable so that the spool can be positioned on the device with the fingers bearing thereagainst. If, on the other hand, the fingers are independent elements, they will most desirably be adjustable with respect to the base for optimum positioning on the spool both radially and axially thereof, and they may be less resilient or quite rigid.

As shown in the drawing, the fingers are advantageously formed with a longitudinal slot so that they can be moved axially relative to the base member to accommodate a spool of any conventional axial length, and thumbscrews may be used for facility in making adjustments. The fingers are adjusted to position the free ends thereof against the upper rim of the spool without extending an undue distance therebeyond, as would tend to cause the fingers to interfere with the strand of material when it is unwound axially from the spool. By designing the device so that the free ends of the fingers can be positioned against the upper rim of a spool seated therein, the tension on the strand of material unwound from the spool can be maintained constant regardless of the portion of the spool from which the filament is taken. A very effective method of preventing entanglement is also provided since, when the material is removed axially, it must pass between the rim and the upper portion of each of the fingers. The fingers should be positionable in this manner for spools of a range of diameters and axial lengths, and this is facilitated by providing the base member with a surface inclined towards the shaft at least at the points to which the fingers are attached, and most conveniently about the entire periphery thereof. This not only causes the fingers to be angled inwardly toward the shaft, but also facilitates tightening them to the desired degree against spools of different sizes and regulation of the force exerted thereagainst. It will be appreciated that with an arrangement of this type the fingers may be relatively rigid, with the means for accommodating spools of different dimensions being provided by adjustment thereof. The fingers may be generally rectilinear or they may be curved, preferably inwardly, to facilitate positioning them so that they bear against the spool. For handling spools of a diameter considerably less than the base diameter, a second set of fingers may be provided with an angularly offset portion to extend inwardly over the surface of the base and then angle upwardly therefrom. If so desired, one end of the fingers can be provided with such an angularly offset portion and this end mounted to the base for use with smaller spools and the other end mounted to the base for spools of diameters approximating that of the base.

The device of the present invention may advantageously include other elements, and particularly mounting means engageable with a supporting surface to provide a firm, non-slipping engagement. For example, the suction cup member which is illustrated is conveniently provided to support the device on a smooth surface; alternatively, the mounting means may comprise a C-clamp type of arrangement, or any other suitable means may be substituted. The device may also be substantially permanently fixed in place by screws or the like, but generally the mounting means will most desirably permit the device to be employed at substantially any location.

The devices of the invention may include various other parts, such as bearings, auxiliary nuts, springs or other biasing means to enhance or modify operation thereof. Thus, rotation of the spool may be facilitated by the provision of roller bearings and the like on the upper surface of the base member, and the support for the spool may be modified, such as with auxiliary nuts of a type not previously referred to. Springs or other biasing means may also aid in the supporting and retaining functions of the device, and they may be useful to produce drag upon the mounted spool to discourage free rotation annd resulting backlash. Other means for prohibiting rotation of the spool, such as a cam-lever type of grip, may also be provided on the device to engage the spool. However, the illustrated and previously described elements of the device are generally adequate for all of these purposes, and the resulting simplicity of the device constitutes a particularly beneficial aspect of the invention.

The base member, finger(s) and shaft may be molded conveniently as a single piece by use of a synthetic plastic material, with resiliency and relative rigidity being provided by the configuration and dimensions of the several portions. However, the various components of the device may be made of a wide variety of materials such as metals, wood, etc., and a combination of different materials may also be used in a single device. The choice will depend primarily upon the need for resiliency and durability, anticipated environmental effects and economics.

Thus it can be seen that the present invention provides a spool supporting device which permits removal from the spool of a continuous strand of material in either an axial or a tangential direction. The device may be readily transported, is simple in design and relatively economical to produce.

Having thus described the invention, I claim:

1. A spool-supporting device comprising a supporting base member, a shaft extending upwardly from said base member, an elongated finger also extending upwardly from said base member and spaced from said shaft, and spool-retaining means, said shaft being insertable into the axial passageway of a spool to be supported by said device, said retaining means being adjustable against the spool to substantially prevent rotation thereof, and said finger and shaft being spaced apart a sufficient distance to seat the spool therebetween with said finger bearing thereagainst.

2. The device of claim 1 wherein said shaft is elongated to extend through the axial passage of a spool supported thereby and wherein said retaining means is a retaining member spaced on said shaft above said base member.

3. The device of claim 2 wherein said retaining member is adjustably and disengageably secured on said shaft and has a portion depending coaxially therefrom and having a diminishing cross-section to provide a tapered circumferential surface, said portion being dimensioned for partial insertion into the axial passageway of the spool.

4. The device of claim 1 wherein said base member is generally disk-shaped and has a diameter at least as great as the diameter of the spool, and wherein a plurality of said fingers is spaced about the periphery of said base member, the length of said fingers being at least equal to the length of the spool so that the spool may be supported on said disk between said fingers with the upper portions thereof bearing against the upper rim of the spool.

5. The device of claim 1 wherein said device has mounting means engageable with a support surface for supporting said device thereon.

6. The device of claim 5 wherein said mounting means is a suction cup member positioned on said base member.

7. The device of claim 1 wherein a plurality of said fingers is adjustably mounted in spaced relationship about the periphery of said base member.

8. The device of claim 7 wherein said base member has a surface portion angularly inclined toward said shaft at the locations at which said fingers are mounted to angle said fingers inwardly toward said shaft.

9. A spool-supporting device comprising a generally disk-shaped base member, an elongated shaft extending coaxially upwardly from said base member, a plurality of elongated, upwardly extending fingers spaced about the periphery of said base member and from said shaft, and a spool retaining member spaced on said shaft above said base member, said shaft being insertable through the axial passageway of a spool to be supported by said device, the length of said fingers being at least equal to the axial length of the spool and the spacing between said fingers and said shaft being sufficient to seat the spool therebetween with the upper portions of said fingers bearing against the upper rim of the spool.

10. The device of claim 9 wherein said retaining member is adjustably and disengageably secured on said shaft and wherein said fingers are adjustably mounted upon said base member.

11. The device of claim 10 wherein said disk-shaped base member has a surface portion angularly inclined toward said shaft at the locations at which said fingers are mounted so as to incline said fingers toward said shaft, wherein said fingers are equidistantly spaced thereabout, wherein said retaining member has a portion depending coaxially therefrom and having a diminishing cross-section to provide tapered circumferential surface, said tapered portion being dimensioned for partial insertion into the axial passageway of the spool, and wherein said device has mounting means engageable with a support surface for supporting said device thereon.

References Cited

UNITED STATES PATENTS

| 2,580,129 | 12/1951 | Rich | 242—129.8 |
| 2,550,927 | 5/1951 | Jurnove et al. | 242—138 |

FOREIGN PATENTS 1,129,295  1/1957  France.

LEONARD D. CHRISTIAN, Primary Examiner

U.S. Cl. X.R.

242—141